United States Patent [19]

Pedersen et al.

[11] 4,393,815

[45] Jul. 19, 1983

[54] HEATING PLANT

[76] Inventors: Niels R. Pedersen, Nybrogaasrdsvej 59; Eyvind S. Nielsen, Alsoddevej 35, both of Hadsund, Denmark, DK 9560

[21] Appl. No.: 253,928
[22] PCT Filed: Aug. 15, 1980
[86] PCT No.: PCT/DK80/00048
    § 371 Date: Apr. 16, 1981
    § 102(e) Date: Apr. 16, 1981
[87] PCT Pub. No.: WO81/00611
    PCT Pub. Date: Mar. 5, 1981
[51] Int. Cl.³ .............................................. F22B 1/02
[52] U.S. Cl. .................................. 122/31 R; 110/215
[58] Field of Search ........................ 122/31 R, 31 A; 110/215; 126/360 A

[56]         References Cited
        U.S. PATENT DOCUMENTS
    751,972  2/1904  Berg ................................... 122/31 A
  4,018,216  4/1977  Thurley ........................ 122/31 A X 4,301,773 11/1981  Johnson ............................ 122/31 A Primary Examiner—Edward G. Favors
Attorney, Agent, or Firm—Cushman, Darby & Cushman

[57]             ABSTRACT

A heating plant which includes an upstanding housing with a combustion chamber in the lower part of the housing, a high pressure burner extending within the combustion chamber, a flue gas pipe extending upwardly from the combustion chamber to terminate in a smoke trap. The smoke trap is in the form of a dome having a dome skirt extending downwardly below the upper level of the flue gas pipe, and a vessel for maintaining a washing liquid at a predetermined level between the upper limits of the flue gas pipe and the lower edge of the dome skirt. Openings are provided in the dome skirt below the level of the liquid, such that smoke coming from the flue gas pipe is forced to bubble through the washing liquid through the openings in the dome wall and up to a chamber to be exhausted from the housing. Various heat exchanger means are provided in the housing for extracting heat from the combustion chamber and the smoke system.

13 Claims, 6 Drawing Figures

HEATING PLANT

The present invention concerns a heating plant for fuel oil, fuel gas, or other combustible liquids or gaseous materials.

Because of the world-wide energy crisis, great effort has been made during the past years to develop full utilization of the heat from the combustible materials, in the field of heating plants—especially oil heating plants. Thus, a highly effective burner with a blue flame, that is a burner which on no account develops soot (vide the brochure "Verbrennung total" RE from M.A.N. Brennerbau, Rossweg 6,2000 Hamburg) has been developed. Even with such a burner, the heating economy is not ideal, as part of the heat from the flue gas is wasted in the chimney air. In connection with such a burner it has been attempted to regenerate the heat which is wasted in the chimney air, but so far without great success. In this connection we refer to an article in "Ingeniøren" no. 49, Dec. 8th, 1978, "Oliefyret minikedel uden forurening og med 100% nyttevirkning", ("Oil heated mini boiler, without pollution and with 100 percent efficiency").

The object of the invention is to provide a heating plant which shows a better heating economy than heating plants of this kind belonging to the prior art.

A construction in accordance with the present invention includes a heating plant comrising a housing, a combustion chamber, a high pressure burner associated with the combustion chamber, an exhaust pipe extending from the combustion chamber vertically within the housing and terminating within a smoke trap, the smoke trap being mounted within the housing and including a dome having a downwardly extending skirt, the skirt extending below the top level of the exhaust pipe, means for maintaining a washing liquid level below the level of the exhaust pipe and above the bottom edge of the dome skirt; openings provided in the dome skirt in the area below the liquid level, said openings decreasing in area from the bottom edge of the skirt to the top limit of said openings below the level of the liquid, an exhaust stack communicating with the housing above the dome, and heat exchange means associated with the housing through which heat exchange fluid may be circulated for removing the heat generated in the heating plant for practical use.

In the heating plant according to the present invention, heat exchangers are suitably provided near the combustion chamber so as to retrieve heat therefrom. The flue gases from the combustion chamber rise through the exhaust pipe into the dome, and the flue gases are thus forced to bubble through the liquid in the housing, such as water, and then through the openings provided in the skirt of the dome. As the pressure of the flue gases increases in the dome, the bubbling will increase as the flue gases are forced lower and lower along the larger area of openings in the skirt of the dome. The burner utilized with the combustion chamber must be of a high efficiency so that soot is not collected in the dome, thereby blocking the openings.

Heat exchangers can be provided in the top horizontal surface of the dome in order to keep the dome surface cool and, of course, to exploit an important heat source. If the dome is made of a metal material, it is essential to have a heat exchanger in the form of a water jacket at the dome top surface so as to prevent the metal from becoming damaged due to the intense heat. If the dome is constructed out of ceramic material, it is believed that such a heat exchanger may not be necessary.

Heat exchangers can also be located in the washing liquid, that is, the water through which the smoke or flue gases are to be bubbled. It has been found that the dome device, according to the present construction, is an effective way of absorbing the condensation heat from the available water vapor in the flue gases. The washing liquid also absorbs the heat from the flue gases.

In a further embodiment of the present invention, there is provided a heat pump associated with the smoke stack from the housing for extracting heat from the flue gases passing up through the smoke stack from the housing of the heat plant.

In a further embodiment of the present invention, there is provided a bypass valve associated with the dome to allow the flue gases to pass directly to the smoke stack without being bubbled through the washing water. This is found necessary in the initial starting of the furnace when the gases are relatively cold and little draft has been produced. The valve can be in the form of a bimetallic plate covering a hole in the skirt of the dome such that the plate is normally open and will close as it is heated.

In a further embodiment, an air-to-air heat exchanger is utilized above the dome, that is, a series of alternate channels conduct the smoke after it has passed through the washing liquid through to the smoke stack while fresh air is forced through intervening channels to extract the heat from the channel walls passing the smoke.

A more specific embodiment of the present invention is characterized by the fact that the openings in the skirt of the dome are V-shaped slits open to the bottom edge of the skirt such that the open area of the slit gradually decreases upwardly from the bottom edge of the skirt. A plurality of holes or apertures should also be provided in the skirt, the diameter of the holes decreasing as the distance from the bottom of the skirt increases.

In another embodiment of the present invention, there is provided a housing in which hermetic partitions separate the housing between the liquid to wash the smoke and a heat exchange liquid which is adapted to pass around the combustion chamber. In such a case, the chamber formed by the partitions is in the lower part of the housing, while the smoke washing liquid is on the upper part of the housing relative to the partitions.

It has surprisingly been found that the heating plant according to the invention shows a considerably better heating economy than plants of this kind belonging to the prior art.

Having thus generally described the nature of the invention, reference will now be made to the accompanying drawings, showing by way of illustration, a preferred embodiment thereof, and in which.

Figure 2:
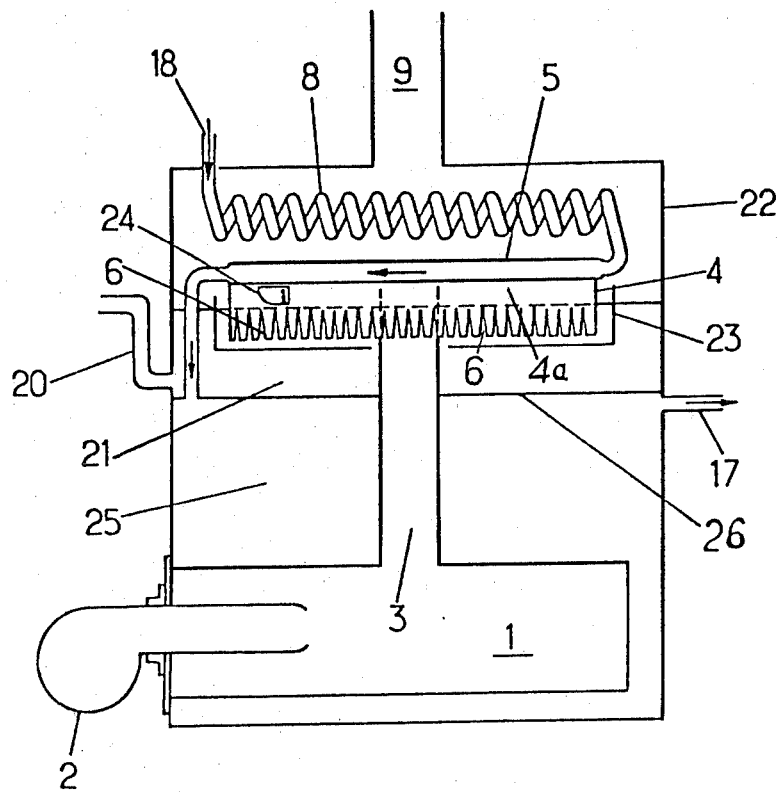
FIG. 2 is a schematic view of another embodiment of the present invention.
Figure 4:
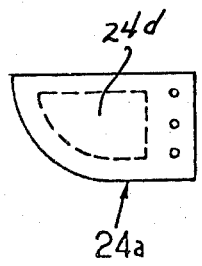
Figure 5:
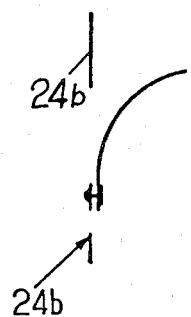
Figure 6:

FIG. 4 which is on the same sheet of drawings as FIG. 2, illustrates a detail of the heating plant shown in FIG. 2;

FIG. 5 which is on the same sheet of drawings as FIG. 2, is an end elevation of the detail shown in FIG. 4; and FIG. 6 which is on the same sheet as FIG. 2, is an end elevation of the detail shown in FIGS. 4 and 5, but showing it in a different operative position.

Figure 1:
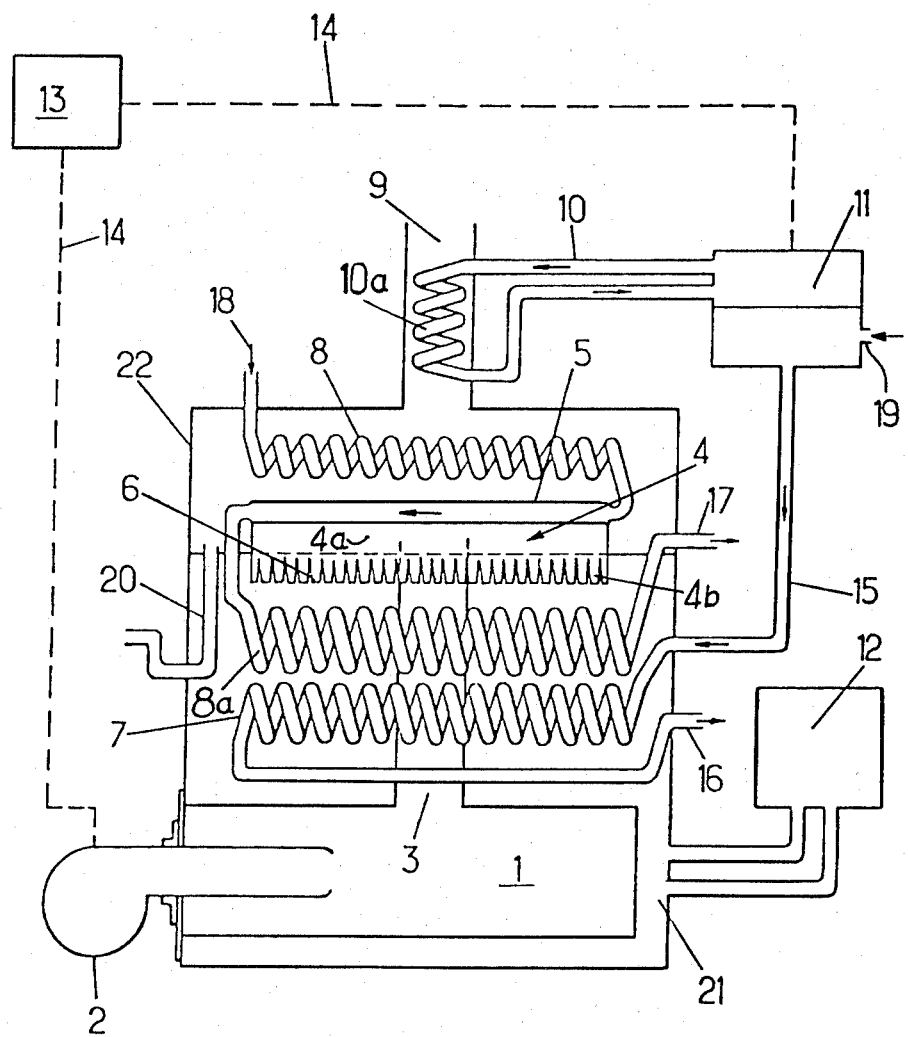
FIG. 1 is a schematic view of one embodiment of the heating plant in accordance with the present invention.

Referring now to the drawings, in FIG. 1, the housing of the heating plant in the form of a boiler, includes an enclosed housing 22, in which is provided a combustion chamber 1 at the bottom of the housing. A high pressure burner 2, sometimes known as a blue flame burner, is provided at one end of the housing and projects within the combustion chamber 1. A flue gas exhaust pipe 3 extends upwardly from the combustion chamber within the housing. Located within the housing and spaced above the exhaust pipe 3 is a dome 4 having a depending skirt 4a extending downwardly and terminating in a skirt edge 4b. A plurality of V-shaped slits 6 extend upwardly from the edge of the skirt as shown. These slits terminate at a location below the top end of the exhaust pipe 3. The housing will normally be filled with a liquid, such as water 21, which is provided for washing the smoke. It is important that the top level of the water in the housing 22 be below the pipe 3 and above the slits 6. Therefore, the bottom part of the skirt 4a of the dome 4 is submerged in the water as are the slits 6. An overflow drain 20 is provided in the housing which is for the purpose of draining any water which may go above the predetermined level.

In the embodiment shown in FIG. 1, the top of the dome is in the form of a water jacket 5 which acts as a heat exchanger. A heat exchanger coil 8 connected to an inlet pipe 18 communicates with the water jacket 5 which in turn communicates with coil 8a submerged below the level of the washing liquid 21. The coil 8a communicates with an outlet pipe 17.

The top portion of the housing 22 above the liquid 21 is empty with the exception of the flue gases escaping in the so-formed chamber which communicates with the smoke stack 9. In the embodiment shown in FIG. 1, a heat exchanger having a coil 10a is provided in the smoke stack 9. Coil 10a communicates with inlet and outlet pipes 10 from the heat pump unit 11. The cold tap water arrives in the heat pump unit by means of inlet 19 and is heated in the heat pump 11 and is discharged through pipe 15 through the heat exchanger coil 7 and then through the outlet 16.

Item 12 is a neutralizer well known in the art for neutralizing the water 21 in the housing 22 as the water picks up considerable chemical waste from the flue gases. Item 13 is a control panel for controlling the heat pump and the burner while leads 14 connect these various items.

When the burner 2 is activated, the flame is located in the combustion chamber 1, and the gases of combustion rise through the exhaust pipe 3 into the dome 4. As the pressure of the flue gases in the dome 4 increases, the flue gases tend to pass downwardly through the water and out through the submerged slits 6 in the skirt 4a to then enter the chamber formed above the wash water 21 in the housing 22. The bubbling or passing of the flue gases through the water, of course, causes heat to transfer to the water as well as chemical waste products. The dome is also heated by the flue gases, thus causing the water passing through the water jacket 5 to be heated. The flue gases are somewhat cooled by the heat exchanger 8 which extracts some heat therefrom, thus causing condensation in the flue gas which falls into the waste water. The cleaned and cooled flue gas then escapes through the smoke stack 9, but at the same time, further heat content is extracted from the flue gases by means of the heat pump coil 10a. The heat exchangers 8 and 8a cause water coming in through the inlet 18 to be heated considerably before it exits through the outlet 17.

Furthermore, ordinary tap water which is cold before it enters the heat pump is heated by the heat extracted from the coil 10a and then passes through a further heat exchanger coil 7 which is submerged in the wash water 21.

Referring now to FIG. 2, similar elements are numbered by the same reference numerals as, for instance, in FIG. 1. In this embodiment, there is the high pressure burner 2 and a combustion chamber 1 as well as an exhaust pipe 3 leading into a dome 4 having a skirt 4a and slits 6 in the skirt. The top of the dome 4 is provided with a water jacket 5 in the form of a heat exchanger as well as a coil 8 leading from the inlet 18 to the heat exchanger water jacket 5. The apparatus is enclosed in the housing 22 which includes a smoke stack 9 to allow the gases to escape once they have been cleaned and cooled. A tray 23 surrounds the bottom of the skirt 4a and extends above the water level of wash water 21. Wash water 21 is provided in the upper portion of the housing 22, and the bottom wall of the chamber is represented by a partition 26 which separates the wash water 21 from the clean water 25 which is to be heated in a heat exchange relationship within the housing 22. In this case, the heat exchange water 25 surrounds the combustion chamber 1 as well as a good portion of the exhaust pipe 3. The water enters through the inlet 18, passes through the heat exchanger coil 8 and into the chamber described above to be later passed through the outlet 17 once the water has been sufficiently heated. The tray 23 acts as an antipulsator to prevent vibrations in the water mass 21. The skirt 4a of the dome 4 is provided with a bypass valve 24 which is constructed as a bimetal plate affixed to the side of the skirt 4a and covering an aperture 24d. The bimetal valve 24b, as illustrated in FIG. 5, is normally in an open position such that when the furnace or heat plant is started, it will be open thus allowing the flue gases to pass through the opening 24d through to the smoke stack 9. However, as the gases heat up and the furnace becomes hotter, the bimetal valve will gradually close until it reaches the position as shown in FIG. 6, thereby forcing the flue gases to bubble through the water through the slits 6 before passing into the heat exchange chamber and the smoke stack 9. The anti-pulsating tray 23, of course, breaks up any vibrations which might be caused by sudden surges of pressure in the dome.

Figure 3:
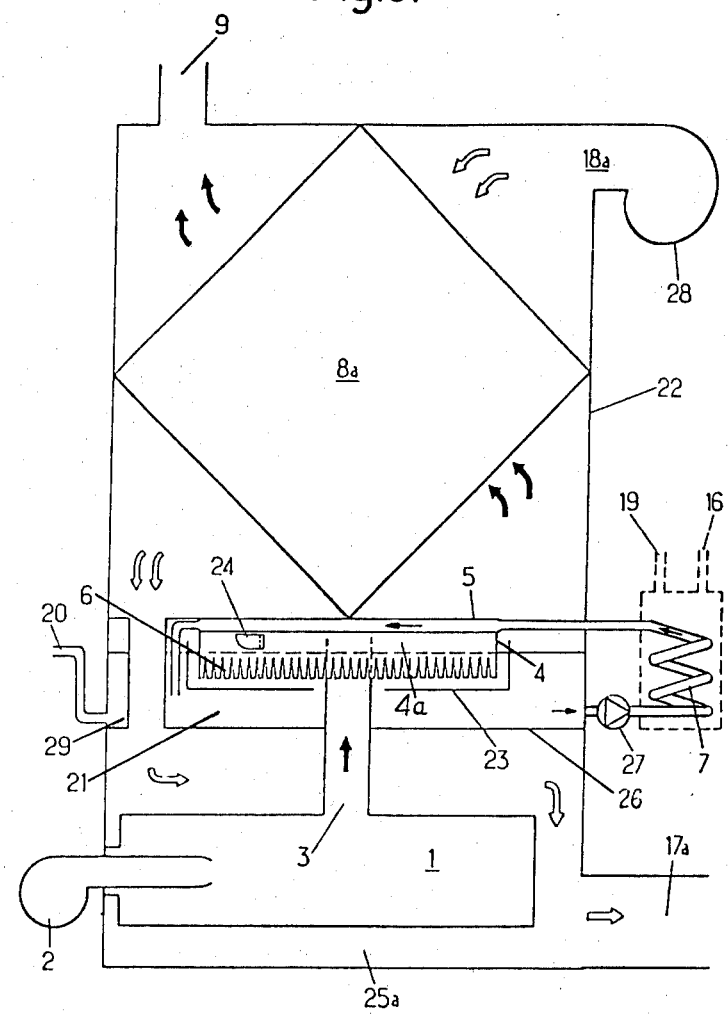
FIG. 3 is a schematic view of yet another embodiment of the present invention.

FIG. 3 shows another embodiment in which many of the elements which are identical to those elements shown in FIGS. 1 and 2 have been identified with the same numerals and not all will be described specifically. However, the housing 22 is enlarged and is adapted for air circulation as opposed to water circulation in the previous embodiments. A fan 28 blows cool air into the housing through the duct 18a and past a heat exchange system which is arranged in alternating channels and identified by the numeral 8a. This is, of course, a conventional heat exchange device and has not been explained here in detail. The cool air then passes through a duct 29 and around the combustion chamber 1 through the heat exchange chamber 25a and out the outlet duct 17a. The dome 4, in this case, is completely enclosed by a subhousing 26, but the wash water 21 is provided and recirculated through the heat exchanger 7 and the water jacket 5 to keep the top of the dome cool.

The coil 7 is in a heat exchange device to allow the fluid or wash water to be cooled before it passes through the water jacket 5. A circulation pump 27 is provided for the purpose of circulating the wash water.

The flue gases which have been bubbled through the dome 4 and the water 21 escape into the chamber thereabove and follow the flow identified by the black arrows through the heat exchanger 8a and then through the smoke stack 9.

We claim:

1. A heating plant comprising a housing, a combustion chamber, a high pressure burner associated with the combustion chamber, an exhaust pipe extending from the combustion chamber vertically within the housing and terminating within a smoke trap provided in the housing, the smoke trap including a dome having a downwardly extending skirt, the skirt extending below the top level of the exhaust pipe, means for maintaining a smoke washing liquid level below the level of the exhaust pipe and above the bottom edge of the dome skirt within the housing, openings provided in the dome skirt in the area below the liquid level, said openings decreasing in area from the bottom edge of the skirt to the top limit of said openings below the level of the liquid, an exhaust stack communicating with the housing above the dome, and heat exchange means associated with the housing through which heat exchange fluid may be circulated for extracting the heat generated in the heating plant.

2. A heating plant as defined in claim 1, wherein the combustion chamber is located within the housing spaced below the smoke trap.

3. A heating plant as defined in claim 2, wherein heat exchangers are suitably provided near the combustion chamber so as to extract heat therefrom, and whereby flue gases from the combustion chamber rise in the exhaust pipe into the dome, and as the pressure is built up, such gases are forced to bubble through the washing liquid in the housing through the openings in the dome skirt; as the pressure of the flue gases increases in the dome, the bubbling will increase as the flue gases are forced lower and lower along the larger area of openings in the skirt of the dome.

4. A heating plant as defined in claim 1, wherein the dome is provided with a heat exchange water jacket in the top surface thereof in order to extract heat therefrom and to keep the dome relatively cool.

5. A heating plant as defined in either one of claims 1 and 2, wherein heat exchange units are provided in the washing liquid and heat extraction fluid is circulated through the heat exchanger therein.

6. A heating plant as defined in claim 1, wherein said heating plant includes a heat pump provided externally of the housing and communicating with a heat exchange coil in the smokestack and wherein the heat pump is effected for heating cold tap water.

7. A heating plant as defined in claim 6, wherein the heat pump also communicates with the heat exchange coil in the washing liquid so as to supplement the transfer of heat to the tap water as it passes through the plant to thereby increase the temperature of the tap water.

8. A heating plant as defined in claim 1, wherein a bypass valve is provided in the dome in order to bypass the flue gas from the smoke trap in the initial stages of combustion while the heating plant is still relatively cold.

9. A heating plant as defined in claim 8, wherein the valve is in the form of an aperture in the skirt of the dome and a bimetallic flap which is normally open is provided and adapted to close the aperture in the skirt when the bimetallic valve has been heated up to a predetermined level.

10. A heating plant as defined in claim 2, wherein a water jacket surrounds the combustion chamber within the housing and a fluid medium for extracting heat is passed through the water jacket to thereby extract heat from the walls of the combustion chamber and the gas flue pipe, and said water jacket being kept separate from the washing liquid which is also provided in the housing.

11. A heating plant as defined in claim 2, wherein the openings provided in the skirt of the dome are in the form of V-shaped slits extending upwardly from the bottom edge of the skirt and terminate at a level below the predetermined washing liquid level, the slits being open to the bottom edge and tapering upwardly.

12. A heating plant as defined in either one of claims 1 or 2, wherein an antipulsation tray is provided in the smoke trap including a flat tray bottom and upstanding side walls overlapping the dome skirt and extending above the liquid level, whereby vibrations in the liquid mass are dampened by said antipulsating tray.

13. A heating plant as defined in claim 2, wherein the housing is suitable for passing air flow, and a first air blower is provided for forcibly passing cool air into the top portion of the housing and through a channeled air heat exchange means and similarly the heat exchange means is adapted to pass smoke emanating from the smoke trap and keep it separate from the air being heated, and air ducts passing about the combustion chamber and a separate vessel for maintaining the washing liquid at a predetermined level about the smoke trap, and the air ducts allowing the air to be heated to pass along the surfaces of the vessel, and outlet means for allowing the now heated air to be removed from the housing.

* * * * *